United States Patent
Sharifi et al.

(10) Patent No.: US 8,775,191 B1
(45) Date of Patent: Jul. 8, 2014

(54) EFFICIENT UTTERANCE-SPECIFIC ENDPOINTER TRIGGERING FOR ALWAYS-ON HOTWORDING

(71) Applicant: Google Inc., Mountain View, CA (US)

(72) Inventors: Matthew Sharifi, Santa Clara, CA (US); Dominik Roblek, Mountain View, CA (US); Sandeep Siddhartha, Andhra Pradesh (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/078,724

(22) Filed: Nov. 13, 2013

(51) Int. Cl.
*G06F 17/27* (2006.01)
(52) U.S. Cl.
USPC .......................................................... 704/275
(58) Field of Classification Search
USPC .......................................................... 704/275
See application file for complete search history.

(56) References Cited

U.S. PATENT DOCUMENTS

| | | | |
|---|---|---|---|
| 7,652,594 B2 * | 1/2010 | Lamont et al. | 340/988 |
| 8,072,353 B2 * | 12/2011 | Lamont et al. | 340/988 |
| 8,170,875 B2 | 5/2012 | Hetherington | |
| 8,175,876 B2 | 5/2012 | Bou-Ghazale | |
| 8,676,565 B2 * | 3/2014 | Larcheveque et al. | 704/9 |
| 8,694,304 B2 * | 4/2014 | Larcheveque et al. | 704/9 |

\* cited by examiner

*Primary Examiner* — Susan McFadden
(74) *Attorney, Agent, or Firm* — Fish & Richardson P.C.

(57) ABSTRACT

Methods, systems, and apparatus, including computer programs encoded on a computer storage medium, for classifying utterances. The methods, systems, and apparatus include actions of obtaining an audio input signal representing an utterance of a user. Additional actions may include determining that a shape of at least a portion of the audio input signal matches a shape of at least a portion of an audio trigger signal corresponding to a keyword. Further actions may include, based at least on determining that the shape of at least the portion of the audio input signal matches the shape of at least the portion of an audio trigger signal corresponding to the keyword, classifying the utterance as a trigger utterance that corresponds to the keyword.

20 Claims, 5 Drawing Sheets

EFFICIENT UTTERANCE-SPECIFIC ENDPOINTER TRIGGERING FOR ALWAYS-ON HOTWORDING

TECHNICAL FIELD

This disclosure generally relates to controlling computers using voice commands.

BACKGROUND

A computer may analyze a user's utterance and may perform an action in response. For example, a user may say "What time is it?" and a computer may respond, "It is 4:30 PM."

SUMMARY

In general, an aspect of the subject matter described in this specification may involve a process for a voice-control enabled system to classify an utterance as a candidate voice command, e.g., a trigger utterance that likely precedes a command for the system, based at least on determining that a shape of a waveform representation of the utterance matches a shape of a trigger signal corresponding to a keyword.

For "always on" systems to respond to utterances from users, audio input, e.g., waveform representations of sounds captured by a microphone, are continuously recorded and evaluated using processes that tend to be computationally expensive. For example, in attempting to semantically interpret audio input, a system may use an endpointing process, or "endpointing," to isolate where individual words or phrases begin and end within the audio input, and may pass the output of an endpointer to an automated speech recognition (ASR) process or engine, to generate a textual transcription.

However, while the audio input may include utterances that represent commands for the system, the audio input may also include sounds that should not be interpreted as commands, such as utterances that are not intended to be commands, utterances that are spoken by people who are not authorized users of the system, as well as background or other noise. By bypassing endpointing on these sounds, computational resources may be spared.

One approach for saving computational resources is to only perform endpointing when the audio input satisfies a specified loudness or energy level threshold. However, even when the audio input loudness or energy level satisfies a threshold, e.g., in a noisy environment, the audio input may not correspond to a command, and the endpointer may be triggered unnecessarily.

Another approach for saving computational resources is to only perform semantic interpretation when a transcription of an audio input includes a particular "hotword," e.g., a predetermined or user-specified key word or phrase, such as "OK COMPUTER." However, the process of identifying a hotword in an audio input, or "hotwording," still often requires that endpointing and/or speech recognition be performed on all audio inputs, even those that do not include a hotword. One advantage of requiring a hotword to preface a voice command is to allow for more efficient and more reliable detection of voice commands, because it may be easier and less computationally expensive for the system to identify a single hotword in an audio input than it would be to identify all of the individual words that could be part of a voice command.

According to one particular implementation of the subject matter described in this specification, endpointing, recognition and/or semantic interpretation are only performed after determining that portions of the audio input include a sound waveform that matches a shape of a waveform of an utterance of a particular keyword, and may this be classified as a candidate command for the system. For example, the system may determine if portions of an audio signal that correspond to local maxima points and minima points match patterns corresponding to local maxima points and minima points in an audio trigger signal. If the system determines the shapes do not match, e.g., are not identical or are not similar to within a predetermined value, the system may bypass further endpointing, recognition, and/or sematic interpretation of the audio input.

If the system determines the shapes do match, the system may then continue processing the audio input, e.g., performing endpointing, recognition, and/or semantic interpretation of the audio input. For example, the system may then endpoint the audio input by designating a portion of the audio input that may include a trigger utterance, by identifying a portion of the audio input that begins a few hundred milliseconds before the matching portion of the audio input and ends a few hundred milliseconds after the matching portion of the audio input. Only then would the designated portion be transcribed by a recognizer and, if the hotword appeared in the transcription, would the utterance be classified as a candidate command to be provided to the semantic interpreter for further evaluation and processing.

In some aspects, the subject matter described in this specification may be embodied in methods that may include the actions of obtaining an audio input signal representing an utterance of a user. Additional actions may include determining that a shape of at least a portion of the audio input signal matches a shape of at least a portion of an audio trigger signal corresponding to a keyword. Further actions may include, based at least on determining that the shape of at least the portion of the audio input signal matches the shape of at least the portion of an audio trigger signal corresponding to the keyword, classifying the utterance as a trigger utterance that corresponds to the keyword.

Other versions include corresponding systems, apparatus, and computer programs, configured to perform the actions of the methods, encoded on computer storage devices.

These and other versions may each optionally include one or more of the following features. For instance, in some implementations classifying the utterance as a trigger utterance that corresponds to the keyword is based at least on performing endpointing that identifies one or more potential individual words in the portion of the audio input signal. Classifying may additionally be based at least on generating a transcription of at least a portion of the utterance of the user from the endpointed portion of the audio input signal based on determining that the shape of at least the portion of the audio input signal matches the shape of at least the portion of an audio trigger signal corresponding to the keyword. Classifying may further be based at least on determining the keyword appears in the transcription and based on determining the keyword appears in the transcription, classifying the utterance as the trigger utterance that corresponds to the keyword.

In certain aspects classifying the utterance as a trigger utterance that corresponds to the keyword is based at least on performing endpointing that identifies one or more potential individual words in the portion of the audio input signal. Classifying may additionally be based at least on generating a transcription of at least a portion of the utterance of the user from the endpointed portion of the audio input signal based on determining that the shape of at least the portion of the audio input signal matches the shape of at least the portion of an audio trigger signal corresponding to the keyword. Classifying may further be based at least on determining the keyword appears in the transcription and based on determining the keyword appears in the transcription, classifying the utterance as the trigger utterance that corresponds to the keyword.

In some aspects, determining that a shape of at least a portion of the audio input signal matches a shape of at least a portion of an audio trigger signal corresponding to a keyword includes determining a relationship, between one or more maxima in the portion of the audio input signal and one or more minima in the portion of the audio input signal, satisfy more than one condition.

In some implementations, determining a relationship, between one or more maxima in the portion of the audio input signal and one or more minima in the portion of the audio input signal, satisfy more than one condition includes determining at least that a ratio between a maxima and a minima satisfy a threshold.

In certain aspects, determining that a shape of at least a portion of the audio input signal matches a shape of at least a portion of an audio trigger signal corresponding to a keyword includes grouping multiple local maxima in the portion of the audio input signal in the portion of the audio input signal separated by one or more local minima and determining that a ratio between a first local maxima and a second local maxima satisfy a threshold.

In some aspects, determining that a shape of at least a portion of the audio input signal matches a shape of at least a portion of an audio trigger signal corresponding to a keyword includes identifying a maxima in the portion of the audio input signal, generating a representation of a frequency spectrum of the audio input signal at the identified maxima, and determining that the representation matches a representation of a frequency spectrum of the audio trigger signal at a corresponding maxima in the audio trigger signal.

In some implementations, determining that a shape of at least a portion of the audio input signal matches a shape of at least a portion of an audio trigger signal corresponding to a keyword includes smoothing at least the portion of the audio input signal and determining that a shape of at least a portion of the smoothed audio input signal matches the shape of at least the portion of the audio trigger signal.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
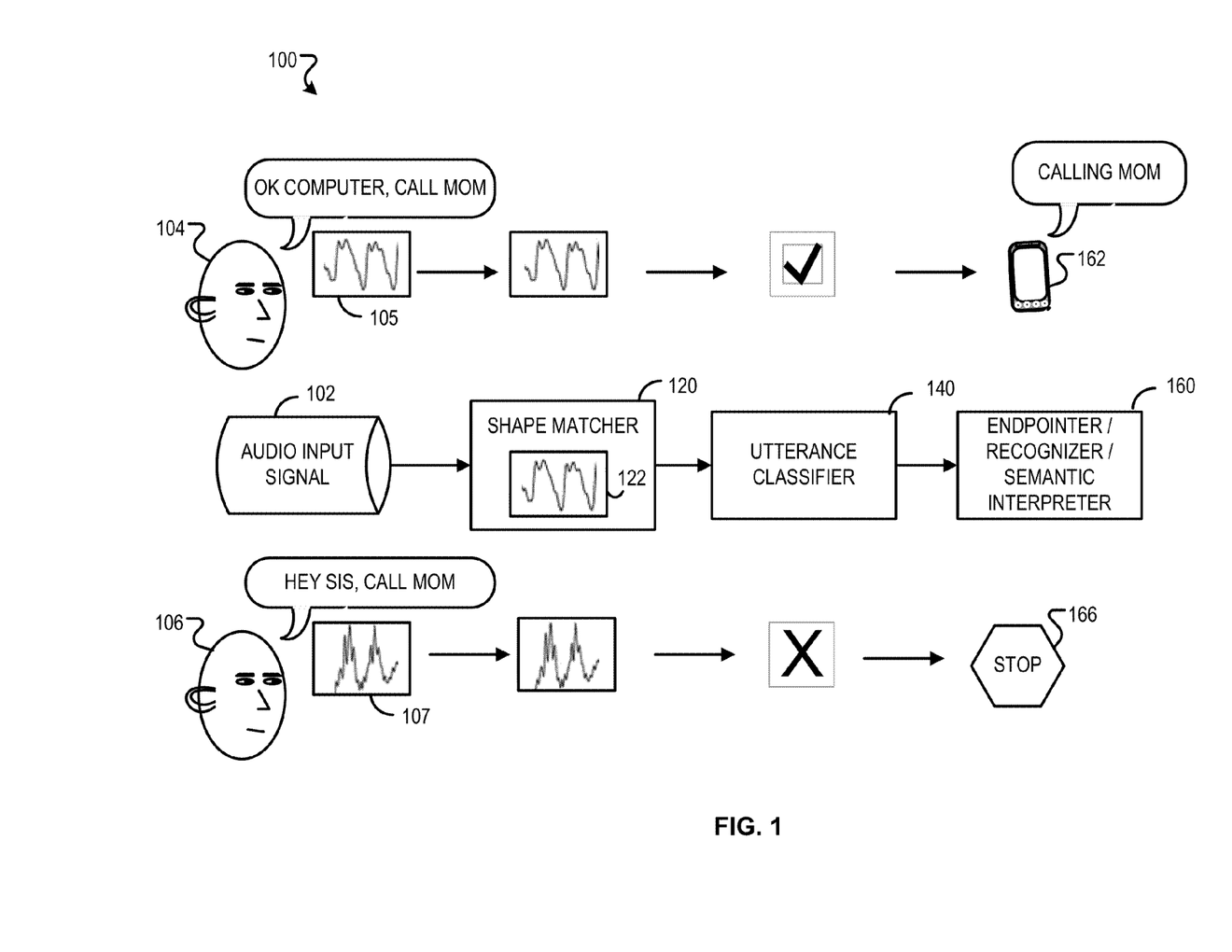
FIG. 1 is a block diagram of an example system for classifying utterances.

FIG. 1 is a block diagram of an example system 100 for classifying utterances. Generally, the system 100 may include a shape matcher 120 that compares a shape of an audio input signal 102 to a shape of an audio trigger signal 122, an utterance classifier 140 that classifies an utterance, e.g., as a candidate voice command or as not a candidate voice command, based on the comparison, and an endpointer/recognizer/semantic interpreter 160 that further processes the audio input signal 102 based on the classification of the utterance.

The audio input signal 102 may be a representation of a sound waveform for an utterance of the user that may be captured by an audio capture device that converts sound into an electrical signal, e.g., a microphone. For example, the audio input signal 102 may be an audio input signal 105 from user 104 that may represent the utterance, "OK COMPUTER, CALL MOM." The particular utterance includes a keyword, "OK COMPUTER," that indicates to the system 100 the words that follow are for a command, "CALL MOM," for the system. The particular command in the example is to call a contact in the user's address book that is associated with the identifier "MOM."

The audio input signal 102 may alternatively be another audio input signal 107 from another user 106 that may represent the utterance "HEY SIS, CALL MOM." The particular utterance may not be a command for the system. For example, the user 106 may be telling his sister to call their mother. The system may classify that the utterance is not a command for the system based on classifying that the utterance does not begin with the keyword "OK COMPUTER."

The shape matcher 120 may obtain the audio input signal 102 and compare a shape of the audio input signal 102 to an expected shape of the audio trigger signal 122. The audio trigger signal 122 may correspond to a keyword, "OK COMPUTER." For example, the audio trigger signal 122 may represent a sound waveform of an utterance of "OK COMPUTER." The shape matcher 120 may determine if a shape of at least a portion of the audio input signal 102 matches a shape of at least a portion of the audio trigger signal 122 corresponding to the keyword.

For example, the shape matcher 120 may obtain the audio input signal 105 representing the utterance "OK COMPUTER, CALL MOM" and determine that the shape of at least a portion of the audio input signal 105 matches the shape of the audio trigger signal 122 corresponding to the keyword "OK COMPUTER." In another example, the shape matcher 120 may obtain the audio input signal 107 "HEY SIS, CALL MOM" and determine that no shape in the audio input signal 107 matches the shape of the audio trigger signal 122 corresponding to the keyword "OK COMPUTER."

The utterance classifier 140 may obtain an indication of the determination made by the shape classifier 120 and classify the utterance represented by the audio input signal 102 based at least on the determination. For example, the utterance classifier 140 may obtain an indication from the shape matcher 120 that the audio input signal 105 "OK COMPUTER, CALL MOM" matches the audio trigger signal 122, and may classify the audio input signal 105 as a candidate voice command. Similarly, the utterance classifier 140 may obtain an indication from the shape matcher 120 that the audio input signal 107 "HEY SIS, CALL MOM" does not match the audio trigger signal 122, and may classify the audio input signal 107 as not a candidate voice command.

Based at least on the determination by the shape matcher 120, the utterance classifier 140 may classify the utterance "OK COMPUTER" in "OK COMPUTER, CALL MOM" as a trigger utterance that corresponds to the keyword. For example, based on receiving an indication that the shape in the audio input signal 105 matches the shape of the audio trigger signal 122, the utterance classifier 140 may determine to further process the audio input signal 105 to classify the utterance "OK COMPUTER" as a trigger utterance.

Based on the output of the utterance classifier, the endpointer/recognizer/semantic interpreter 160 may determine that the beginning of the portion of the audio input signal 105 that corresponds to "OK COMPUTER" marks the beginning of a potential trigger utterance, and that the potential trigger utterance may end at a later point in the audio input signal 105, e.g., a few hundred milliseconds after "OK COMPUTER" starts, a few hundred milliseconds after "OK COMPUTER" ends, or once the audio input signal 105 is continuously below a particular threshold loudness or energy level for at least a few hundred milliseconds. The endpointer/recognizer/semantic interpreter 160 may further process the determined portion of the audio input signal 105 by performing endpointing on the determined portion of the audio input signal to identify the portions of the audio input that may correspond to individual words, and performing a speech to text process on the endpointed portion of the audio input signal 105.

The endpointer/recognizer/semantic interpreter 160 may then determine if the transcription includes the keyword based on identifying if the keyword appears in the transcription. If the transcription includes the keyword, the endpointer/recognizer/semantic interpreter 160 may classify the utterance as a trigger utterance. If the transcription does not include the keyword, the endpointer/recognizer/semantic interpreter 160 may classify the utterance as not a trigger utterance, even though the shape matcher 120 determined the shape in the audio input signal 105 matches the shape of the audio trigger signal 122.

Based at least on the determination by the shape matcher 120, the utterance classifier 140 may classify the utterance, or any portion of the utterance, "HEY SIS, CALL MOM," as not a trigger utterance that corresponds to the keyword. For example, based on receiving an indication that no shape in the audio input signal 107 matches the shape of the audio input trigger 122, the utterance classifier 140 may classify the utterance as not a trigger utterance without any further processing by the endpointer/recognizer/semantic interpreter 160 to determine if the utterance includes the keyword, e.g., no speech-to-text recognition performed, and stop further processing of the utterance 166. Accordingly, the system 100 may reduce the amount of computation needed to classify an utterance, e.g., by avoiding additional unnecessary processing for endpointing, which may reduce the amount of computation spent on utterances that are not commands for the system 100.

In some implementations, the shape matcher 120 and utterance classifier 140 may classify utterances as trigger signals even before users are finished speaking the keywords. For example, the utterance classifier 140 may already classify the utterance "OK COMPU-" as a trigger utterance. Classifying trigger utterances before users are finished speaking keywords may make the system 100 more responsive.

The endpointer/recognizer/semantic interpreter 160 may receive the audio input signal 105 including the utterance "OK COMPUTER, CALL MOM" and an indication that the utterance classifier 140 classified the "OK COMPUTER" portion of the utterance as a trigger utterance. The endpointer/recognizer/semantic interpreter 160 may then transcribe the entire utterance and determine that the utterance corresponds to the command "CALL MOM." The endpointer/recognizer/semantic interpreter 160 may then initiate a calling operation where the number associated with the identifier "MOM" is called, and initiate an operation to indicate to the user that the user's mom is being called by outputting "CALLING MOM" 162.

Different configurations of the system 100 may be used where functionality of the shape matcher 120, utterance classifier 140, and endpointer/recognizer/semantic interpreter 160 may be combined, further separated, distributed, or interchanged. The system 100 may be implemented in a single device or distributed across multiple devices.

Figure 2:
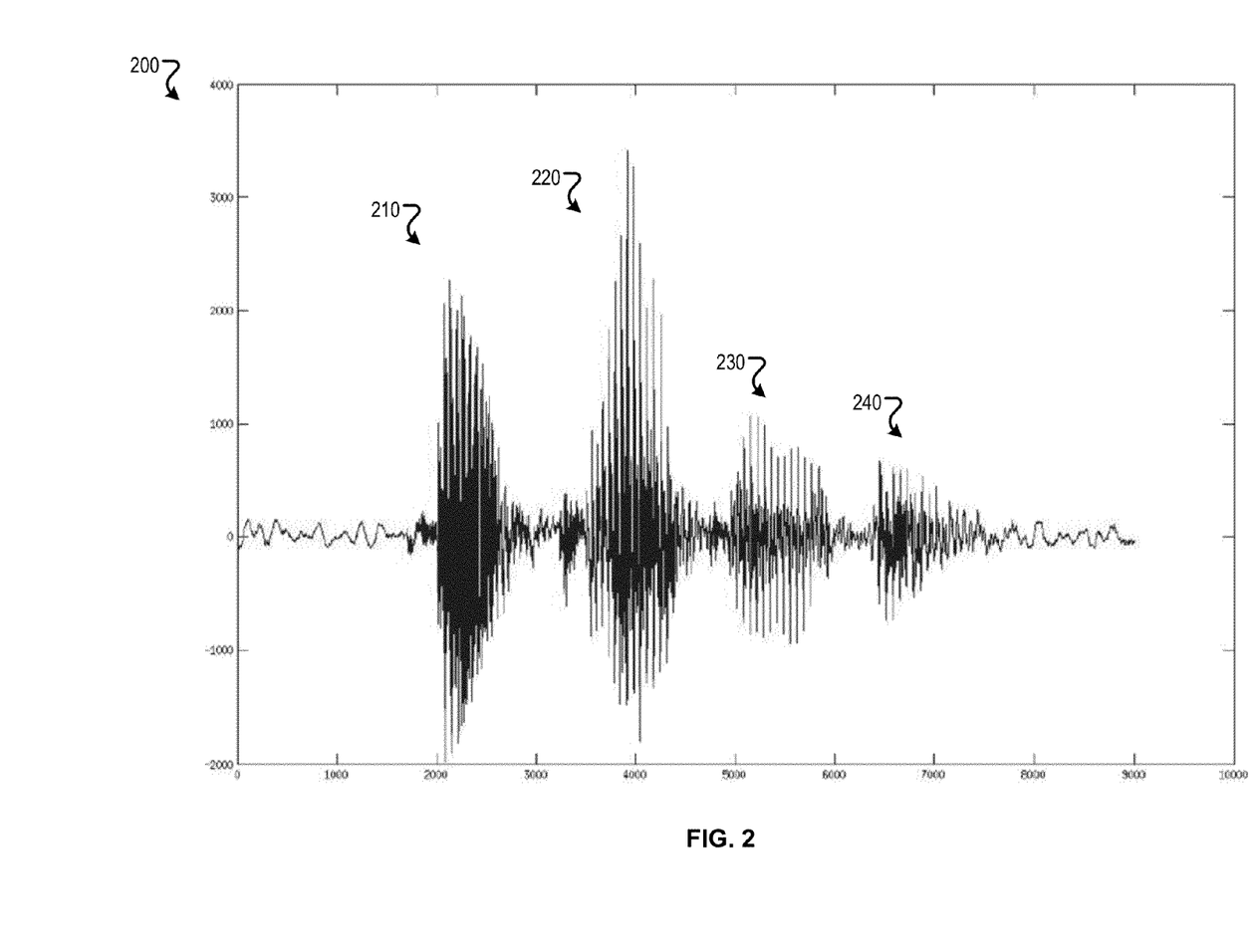
FIG. 2 is a graph of an example audio input signal.

FIG. 2 is a graph 200 of an example audio input signal. The audio input signal may correspond to captured sound waveform corresponding to the utterance "OK COMPUTER." The X-axis of the graph 200 may indicate time in milliseconds and the Y-axis may indicate amplitude of the degree of change in atmospheric pressure caused by the sound waveform.

The "O" sound may correspond to the peaks at 210, the "K" sound may correspond to the peaks at 220, the "COM" sound may correspond to the peaks at 230, and the "PUTER" may correspond to the peaks at 240. As can be seen in the graph 200, the "O" and "K" sounds have higher peaks than the other sounds because the "O" and "K" sounds are louder. The "K" sound is also separated in time by a few milliseconds from the "O" sound and the "COM" sound.

Figure 3:
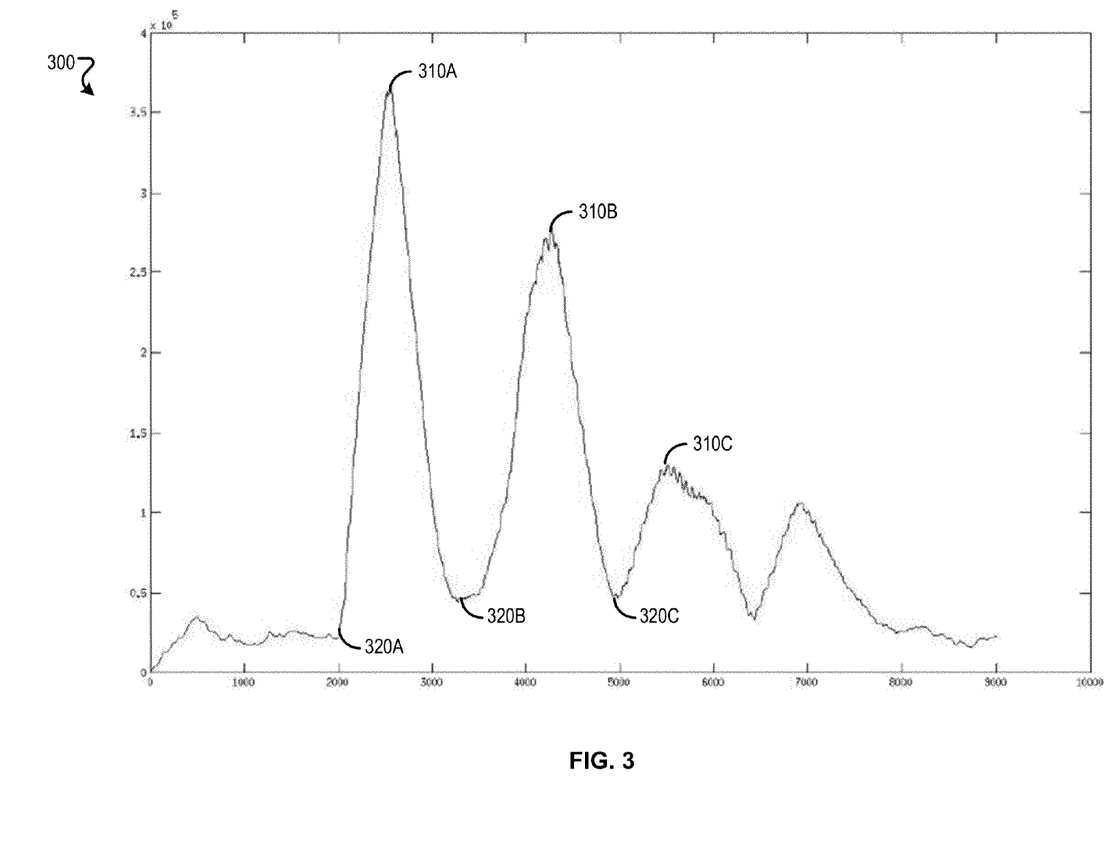
FIG. 3 is a graph of an example smoothed audio input signal.

FIG. 3 is a graph 300 of an example smoothed audio input signal. The smoothed audio input signal may be generated from the audio input signal shown in graph 200 of FIG. 2, which may be an unsmoothed audio input signal. The smoothed audio input signal may be generated by smoothing the absolute values of the unsmoothed audio input signal using a finite impulse response filter with a window of fifty milliseconds.

Local minima points and local maxima points may be found in the smoothed audio input signal based on finding extrema within a particular window, e.g., a sixty millisecond window, on each side of a peak in the smoothed audio input signal. The graph 300 shows a minima at 320A corresponding to before the "O" sound starts, a maxima at 310A corresponding to when the "O" sound peaks, a minima at 320B corresponding to a pause after the "O" sound finished and before the "K" sound begins, a maxima at 310B corresponding to when the "K" sound peaks, a minima at 320C when the "K" sound ends and before the "COM" sound begins, and a maxima at 310C when the "COM" sound peaks.

The shape matcher 120 may compare shapes or patterns of local maxima and minima points associated with smoothed signals. For example, the shape matcher 120 may receive an unsmoothed audio input signal, smooth the audio input signal, and then compare the smoothed audio input signal to an audio trigger signal that may be smoothed. Additionally or alternatively, the shape matcher 120 may receive a smoothed audio input signal and compare the smoothed audio input signal to a smoothed trigger signal.

Figure 4:
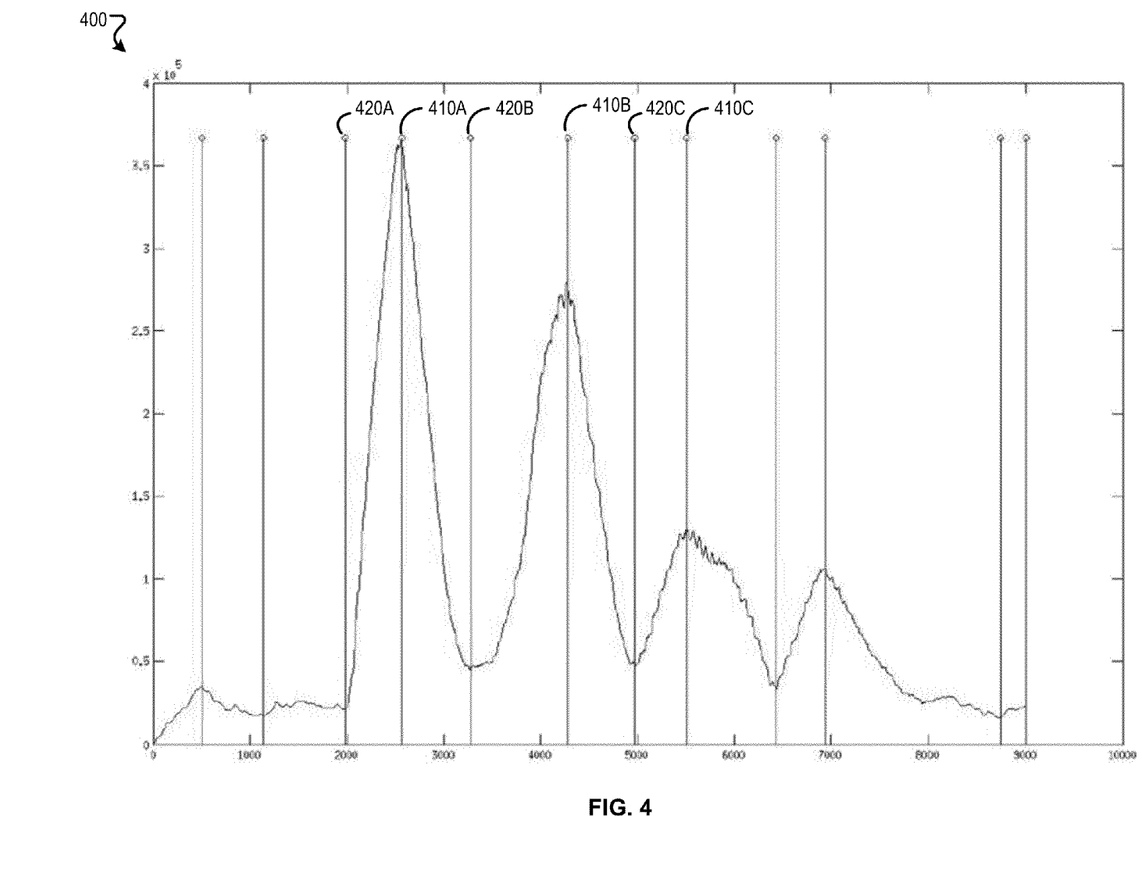
FIG. 4 is a graph of an example smoothed audio input signal with marked extrema.

FIG. 4 is a graph 400 of an example smoothed audio input signal with marked extrema. The marked extrema may include local maxima and local minima. For example, the marked extrema may include the minima and maxima described in the graph 300 of FIG. 3. Graph 400 may include marking lines 420A-C and 410A-C, which may be vertical lines that mark minima and maxima in the graph 300. Marking lines 420A-C may mark minima 320A-C and 410A-C may mark maxima 310A-C.

The shape matcher 120 may determine if shapes of audio input signals match shapes of audio trigger signals based on matching extrema in the signals. For example, the shape matcher 120 may determine that a shape of an audio input signal matches a shape of an audio trigger signal if the maxima and minima in the audio trigger signal correspond to maxima and minima in the audio input signal, e.g., have similar relative amplitudes and similar relative timing. On the other hand, the shape matcher may determine that a shape of an audio input signal does not match a shape of an audio trigger signal if the maxima and minima in the audio trigger signal do not correspond to maxima and minima in the audio input signal.

In matching extrema in the signals, the shape matcher 120 may group extrema. The shape matcher 120 may group extrema based on groupings that match the shape of the audio trigger signal. For example, an audio trigger signal for the keyword "OK COMPUTER" may include three large maxima, representing "O," "K," and "COM," respectively, separated by two minima, which may represent silence.

The shape matcher 120 may determine that groups of extrema that satisfy grouping criteria match the shape of the audio trigger signal. Grouping criteria may be (i) three maxima separated by two minima, (ii) all the maxima are at least one hundred milliseconds apart and no more than five hundred milliseconds apart, (iii) both minima are roughly centered between the maxima, (iv) all the maxima are larger than all the minima, and (v) the largest maxima is significantly larger than the smallest minima. The criteria may be different based on different keywords. For example, the criteria may be four maxima separated by three minima or all maxima at least two hundred milliseconds apart. Additional criteria or fewer criteria may also be used.

If the shape matcher 120 does not identify a group of extrema in the audio input signal that satisfies the grouping criteria, the shape matcher 120 may classify the audio input signal as not having a shape that matches the shape of the audio trigger signal. If the shape matcher 120 does identify one or more groups of extrema in the audio input signal that satisfy the grouping criteria, the shape matcher 120 may perform further processing to classify the audio input signal.

For example, the shape matcher 120 may score the audio input signal based on comparing the amplitudes of the maxima and the minima. For example, the shape matcher 120 may generate a score based on a combination of the ratio between the largest maxima and the smallest minima. A large ratio between the largest maxima and the smallest minima may be associated with a larger score as the ratio may indicate the largest maxima is much louder than the smallest minima. The shape matcher 120 may additionally take into account the ratio between the largest and smallest maxima. A large ratio between the largest and smallest maxima may be associated with a smaller score as the ratio may indicate the maxima are not uniform.

The shape matcher 120 may classify the audio input signal based on the score. For example, the shape matcher 120 may classify the audio input signal as having a shape that matches the shape of the audio trigger signal if the score is greater than a threshold score. On the other hand, the shape matcher 120 may classify the audio input signal as not having a shape that matches the shape of the audio trigger signal if the score is lower than or equal to the threshold score.

Different scoring algorithms may also be used. For example, the average or median of all maxima may be compared with the average or median of all minima. Additionally or alternatively, the grouping criteria may be combined with the scoring algorithms so that the shape matcher 120 reduces scores based on determining grouping criteria is not satisfied and increases scores based on determining the grouping criteria is satisfied.

The shape matcher 120 may generate the grouping criteria based on the keyword. The shape matcher 120 may obtain an audio trigger signal, identify maxima and minima in the audio trigger signal, identify relationships between the maxima and minima, e.g., differences in timing and amplitudes, and generate criteria based on the identified relationships. For example, the shape matcher may obtain the audio trigger signal corresponding to the keyword "HOCUS-POCUS," and generate criteria of four maxima separated by three minima and the second maxima and fourth maxima roughly equivalent in amplitude." Additionally or alternatively, the shape matcher 120 may obtain grouping criteria that is based on the keyword.

The shape matcher 120 may additionally or alternatively determine if shapes match based on identifying a maxima in the portion of the audio input signal, generating a representation of a frequency spectrum of the audio input signal at the identified maxima, and determining that the representation matches a representation of a frequency spectrum of the audio trigger signal at a corresponding maxima in the audio trigger signal. Accordingly, the system 100 may classify an utterance based on the frequency spectrum extracted around a peak in an audio input signal representing the utterance.

For example, the shape matcher 120 may compare a frequency spectrum of the audio input signal shown at the first maxima in a grouping to the first maxima in the audio trigger signal. Additionally or alternatively, the shape matcher 120 may compare the frequency spectrum of other minima or maxima, e.g., the frequency spectrum of the first minimas, the second maximas, and the second minimas. Shapes with similar frequency spectrum may be scored as being shapes that are more similar.

In a more detailed example of using frequency spectrum to further reduce the amount of audio that is sent to a speech recognizer, if the shape matcher 120 determines the score of an audio input signal satisfies a threshold score, the shape matcher 120 may further process the first two maxima before triggering speech recognition. The further processing may include computing a slice of mel-frequency cepstrum coefficients (MFCC) for a small window, e.g., thirty two milliseconds, around the first two maxima. The two slices of MFCC may then be classified to give an indication of whether the first two maxima, which may be syllables, correspond to "O" and "K."

The utterance classifier 140 may also use extrema identified by the shape matcher 120 in determining the portion of the audio input signal to transcribe. For example, the utterance classifier 140 may transcribe from the portion one second before the first maxima to three seconds after the first maxima that matches the audio trigger signal. Additionally or alternatively, the utterance classifier 140 may transcribe from the portion one second before the first maxima to one second after the last maxima that matches the audio trigger signal.

Figure 5:
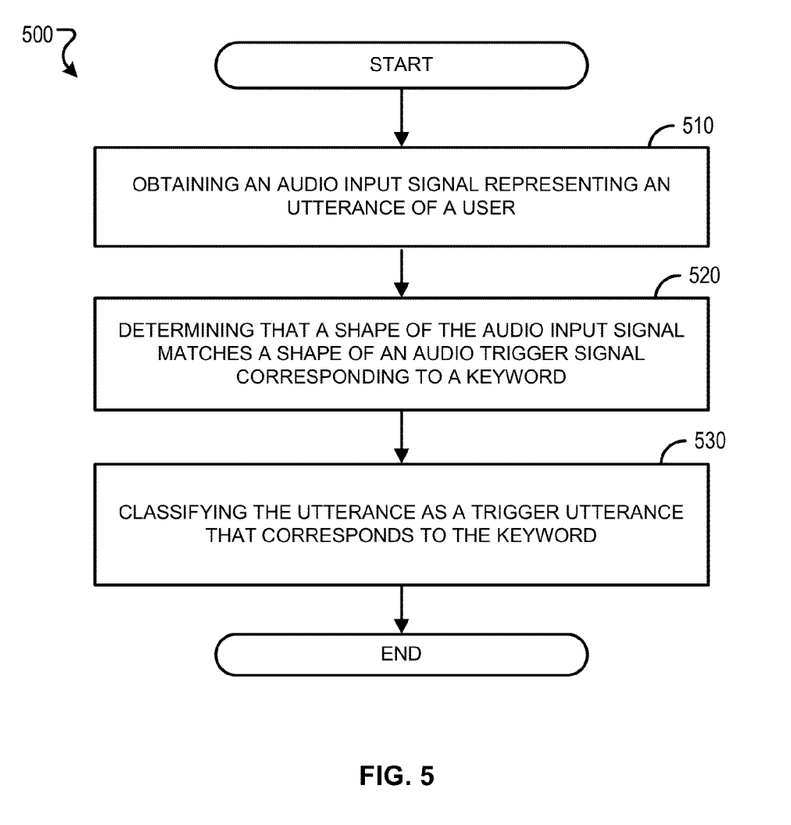
FIG. 5 is a flowchart of an example process for classifying utterances.

FIG. 5 is a flowchart of an example process 500 for classifying utterances. The following describes the processing 500 as being performed by components of the system 100 that are described with reference to FIG. 1. However, the process 500 may be performed by other systems or system configurations.

The process 500 may include obtaining an audio input signal representing an utterance of a user (510). For example, the shape matcher 120 may obtain an audio input signal 105 representing an utterance "OK COMPUTER, CALL MOM." Additionally or alternatively, the shape matcher 120 may obtain an audio input signal 107 representing an utterance "HEY SIS, CALL MOM."

The process 500 may include determining that a shape of the audio input signal matches a shape of an audio trigger signal corresponding to a keyword (520). For example, the shape matcher 120 may determine that a shape of input signal 105 matches a shape of the audio trigger signal 122 corresponding to the keyword "OK COMPUTER." Additionally or alternatively, the shape matcher 120 may determine that a shape of input signal 107 does not match the shape of the audio trigger signal 122.

The process 500 may include classifying the utterance as a trigger utterance that corresponds to the keyword (530). For example, the utterance classifier 140 may classify the utterance "OK COMPUTER" in "OK COMPUTER, CALL MOM" as a trigger utterance based at least on a determination by the shape matcher 120 that a shape of the input signal 105 matches the shape of the audio trigger signal 122. Additionally or alternatively, the utterance classifier 140 may classify the utterance "HEY SIS, CALL MOM" as not a trigger utterance based at least on a determination by the shape matcher 120 that a shape of the input signal 105 does not match the shape of the audio trigger signal 122.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
   obtaining, using one or more computing devices, an audio input signal representing an utterance of a user;
   determining, using the one or more computing devices, that a shape of at least a portion of the audio input signal matches a shape of at least a portion of an audio trigger signal corresponding to a keyword; and
   based at least on determining that the shape of at least the portion of the audio input signal matches the shape of at least the portion of an audio trigger signal corresponding to the keyword, classifying, the one or more computing devices, the utterance as a trigger utterance that corresponds to the keyword.

2. The method of claim 1, wherein classifying the utterance as a trigger utterance that corresponds to the keyword is based at least on:
   performing endpointing that identifies one or more potential individual words in the portion of the audio input signal;
   generating a transcription of at least a portion of the utterance of the user from the endpointed portion of the audio input signal based on determining that the shape of at least the portion of the audio input signal matches the shape of at least the portion of an audio trigger signal corresponding to the keyword;
   determining the keyword appears in the transcription; and
   based on determining the keyword appears in the transcription, classifying the utterance as the trigger utterance that corresponds to the keyword.

3. The method of claim 1, wherein determining that a shape of at least a portion of the audio input signal matches a shape of at least a portion of an audio trigger signal corresponding to a keyword comprises:
   determining a relationship, between one or more maxima in the portion of the audio input signal and one or more minima in the portion of the audio input signal, satisfy more than one condition.

4. The method of claim 3, wherein determining a relationship, between one or more maxima in the portion of the audio input signal and one or more minima in the portion of the audio input signal, satisfy more than one condition comprises:
   determining at least that a ratio between a maxima and a minima satisfy a threshold.

5. The method of claim 1, wherein determining that a shape of at least a portion of the audio input signal matches a shape of at least a portion of an audio trigger signal corresponding to a keyword comprises:
   grouping multiple local maxima in the portion of the audio input signal in the portion of the audio input signal separated by one or more local minima;
   determining that a ratio between a first local maxima and a second local maxima satisfy a threshold.

6. The method of claim 1, wherein determining that a shape of at least a portion of the audio input signal matches a shape of at least a portion of an audio trigger signal corresponding to a keyword comprises:
   identifying a maxima in the portion of the audio input signal;
   generating a representation of a frequency spectrum of the audio input signal at the identified maxima; and
   determining that the representation matches a representation of a frequency spectrum of the audio trigger signal at a corresponding maxima in the audio trigger signal.

7. The method of claim 1, wherein determining that a shape of at least a portion of the audio input signal matches a shape of at least a portion of an audio trigger signal corresponding to a keyword comprises:
   smoothing at least the portion of the audio input signal; and
   determining that a shape of at least a portion of the smoothed audio input signal matches the shape of at least the portion of the audio trigger signal.

8. A system comprising:
   one or more computers; and
   one or more storage devices storing instructions that are operable, when executed by the one or more computers, to cause the one or more computers to perform operations comprising:
      obtaining an audio input signal representing an utterance of a user;
      determining that a shape of at least a portion of the audio input signal matches a shape of at least a portion of an audio trigger signal corresponding to a keyword; and
      based at least on determining that the shape of at least the portion of the audio input signal matches the shape of at least the portion of an audio trigger signal corresponding to the keyword, classifying the utterance as a trigger utterance that corresponds to the keyword.

9. The system of claim 8, wherein classifying the utterance as a trigger utterance that corresponds to the keyword is based at least on:
performing endpointing that identifies one or more potential individual words in the portion of the audio input signal;
generating a transcription of at least a portion of the utterance of the user from the endpointed portion of the audio input signal based on determining that the shape of at least the portion of the audio input signal matches the shape of at least the portion of an audio trigger signal corresponding to the keyword;
determining the keyword appears in the transcription; and
based on determining the keyword appears in the transcription, classifying the utterance as the trigger utterance that corresponds to the keyword.

10. The system of claim 8, wherein determining that a shape of at least a portion of the audio input signal matches a shape of at least a portion of an audio trigger signal corresponding to a keyword comprises:
determining a relationship, between one or more maxima in the portion of the audio input signal and one or more minima in the portion of the audio input signal, satisfy more than one condition.

11. The system of claim 10, wherein determining a relationship, between one or more maxima in the portion of the audio input signal and one or more minima in the portion of the audio input signal, satisfy more than one condition comprises:
determining at least that a ratio between a maxima and a minima satisfy a threshold.

12. The system of claim 8, wherein determining that a shape of at least a portion of the audio input signal matches a shape of at least a portion of an audio trigger signal corresponding to a keyword comprises:
grouping multiple local maxima in the portion of the audio input signal in the portion of the audio input signal separated by one or more local minima;
determining that a ratio between a first local maxima and a second local maxima satisfy a threshold.

13. The system of claim 8, wherein determining that a shape of at least a portion of the audio input signal matches a shape of at least a portion of an audio trigger signal corresponding to a keyword comprises:
identifying a maxima in the portion of the audio input signal;
generating a representation of a frequency spectrum of the audio input signal at the identified maxima; and
determining that the representation matches a representation of a frequency spectrum of the audio trigger signal at a corresponding maxima in the audio trigger signal.

14. The system of claim 8, wherein determining that a shape of at least a portion of the audio input signal matches a shape of at least a portion of an audio trigger signal corresponding to a keyword comprises:
smoothing at least the portion of the audio input signal; and
determining that a shape of at least a portion of the smoothed audio input signal matches the shape of at least the portion of the audio trigger signal.

15. A non-transitory computer-readable medium storing software comprising instructions executable by one or more computers which, upon such execution, cause the one or more computers to perform operations comprising:
obtaining an audio input signal representing an utterance of a user;
determining that a shape of at least a portion of the audio input signal matches a shape of at least a portion of an audio trigger signal corresponding to a keyword; and
based at least on determining that the shape of at least the portion of the audio input signal matches the shape of at least the portion of an audio trigger signal corresponding to the keyword, classifying the utterance as a trigger utterance that corresponds to the keyword.

16. The medium of claim 15, wherein classifying the utterance as a trigger utterance that corresponds to the keyword is based at least on:
performing endpointing that identifies one or more potential individual words in the portion of the audio input signal;
generating a transcription of at least a portion of the utterance of the user from the endpointed portion of the audio input signal based on determining that the shape of at least the portion of the audio input signal matches the shape of at least the portion of an audio trigger signal corresponding to the keyword;
determining the keyword appears in the transcription; and
based on determining the keyword appears in the transcription, classifying the utterance as the trigger utterance that corresponds to the keyword.

17. The medium of claim 15, wherein determining that a shape of at least a portion of the audio input signal matches a shape of at least a portion of an audio trigger signal corresponding to a keyword comprises:
determining a relationship, between one or more maxima in the portion of the audio input signal and one or more minima in the portion of the audio input signal, satisfy more than one condition.

18. The medium of claim 17, wherein determining a relationship, between one or more maxima in the portion of the audio input signal and one or more minima in the portion of the audio input signal, satisfy more than one condition comprises:
determining at least that a ratio between a maxima and a minima satisfy a threshold.

19. The medium of claim 15, wherein determining that a shape of at least a portion of the audio input signal matches a shape of at least a portion of an audio trigger signal corresponding to a keyword comprises:
grouping multiple local maxima in the portion of the audio input signal in the portion of the audio input signal separated by one or more local minima;
determining that a ratio between a first local maxima and a second local maxima satisfy a threshold.

20. The medium of claim 15, wherein determining that a shape of at least a portion of the audio input signal matches a shape of at least a portion of an audio trigger signal corresponding to a keyword comprises:
identifying a maxima in the portion of the audio input signal;
generating a representation of a frequency spectrum of the audio input signal at the identified maxima; and
determining that the representation matches a representation of a frequency spectrum of the audio trigger signal at a corresponding maxima in the audio trigger signal.

* * * * *